United States Patent [19]
Foster

[11] Patent Number: 5,984,076
[45] Date of Patent: *Nov. 16, 1999

[54] DRIVE ASSEMBLY FOR RECIPROCATING SLAT CONVEYOR

[76] Inventor: Raymond Keith Foster, P.O. Box 1, Madras, Oreg. 97741

[*] Notice: This patent issued on a continued prosecution application filed under 37 CFR 1.53(d), and is subject to the twenty year patent term provisions of 35 U.S.C. 154(a)(2).

[21] Appl. No.: 08/804,906

[22] Filed: Feb. 25, 1997

Related U.S. Application Data

[63] Continuation-in-part of application No. 08/571,564, Dec. 13, 1995, Pat. No. 5,605,221, which is a continuation-in-part of application No. 08/390,759, Feb. 17, 1995, Pat. No. 5,482,155.

[51] Int. Cl.[6] .................................................. B65G 25/00
[52] U.S. Cl. ..................................... 198/250.5; 414/525.1
[58] Field of Search .............................. 198/750.5, 750.6; 414/525.1, 525.9

[56] References Cited

U.S. PATENT DOCUMENTS

| | | | |
|---|---|---|---|
| Re. 35,022 | 8/1995 | Foster | 198/750.5 |
| 4,748,893 | 6/1988 | Foster | 91/176 |
| 5,165,524 | 11/1992 | Foster | 198/750 |
| 5,193,661 | 3/1993 | Foster | 198/750 |
| 5,255,712 | 10/1993 | Foster | 137/522 |
| 5,313,872 | 5/1994 | Foster | 91/407 |
| 5,325,763 | 7/1994 | Foster | 91/422 |
| 5,390,781 | 2/1995 | Foster | 198/750 |
| 5,427,229 | 6/1995 | Foster | 198/750.7 |
| 5,433,312 | 7/1995 | Foster | 198/750.5 |
| 5,622,095 | 4/1997 | Foster . | |
| 5,758,683 | 6/1998 | Cook . | |

*Primary Examiner*—Jospeh E. Valenza
*Attorney, Agent, or Firm*—John H. Pauly; Delbert J. Barnard

[57] ABSTRACT

A drive assembly has a plurality of piston/cylinder drive units each of which has a piston component longitudinally fixed to a fixed transverse frame member. First and second working chambers in a movable cylinder component are connected to pressure and return through passageways extending through the piston rod of the piston component. A ball member on the outer end of the piston rod is received in a socket structure that has passageways communicating with the piston passageways. A manifold structure is secured to the socket structures and houses a plurality of internal valves including a switching valve with a single external pressure port and a single external return port. The socket structures and manifold structure have abutting surfaces that form internal fluid connections to allow operation of the conveyor without external fluid ports other than the two ports of the switching valve.

14 Claims, 12 Drawing Sheets

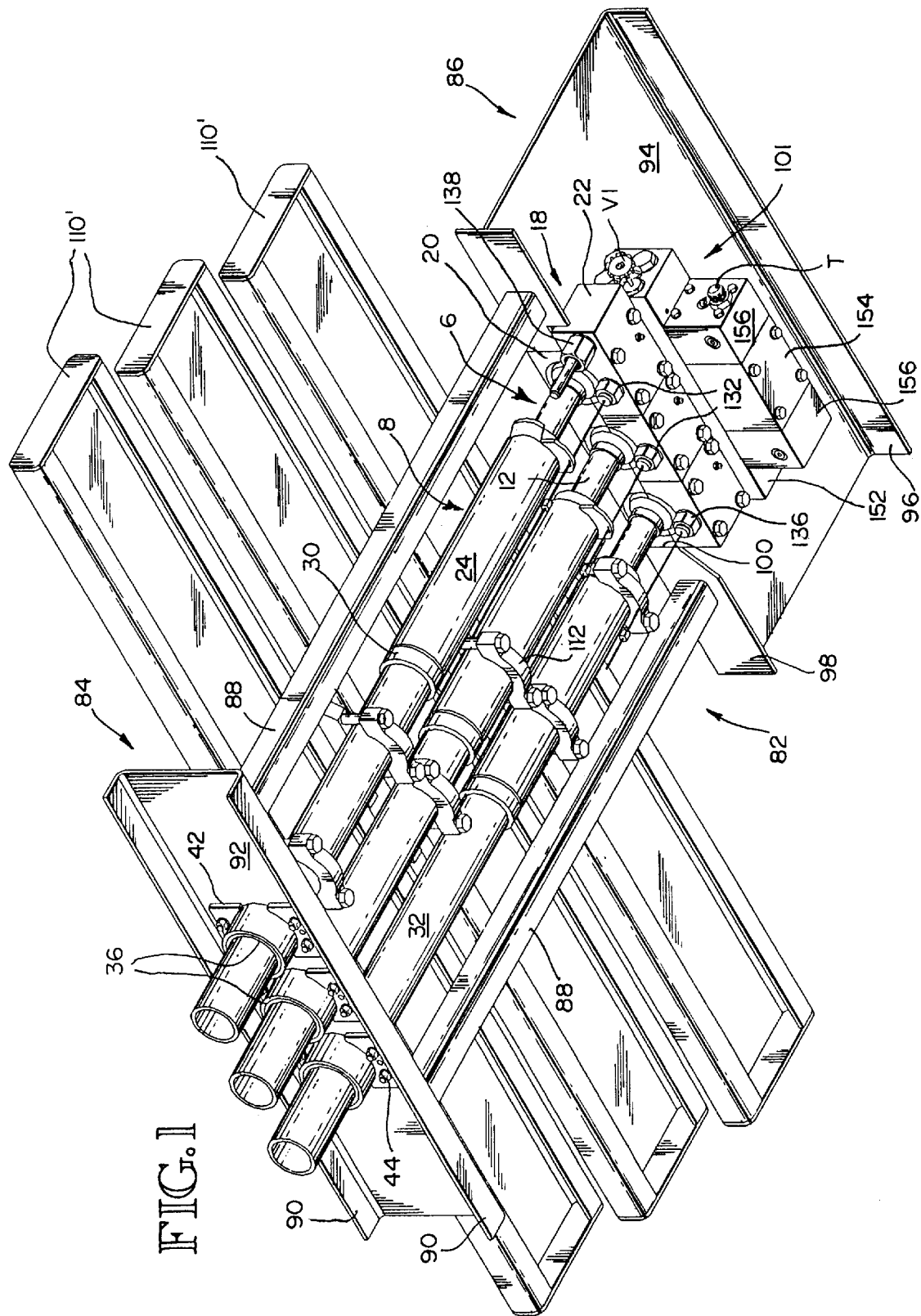

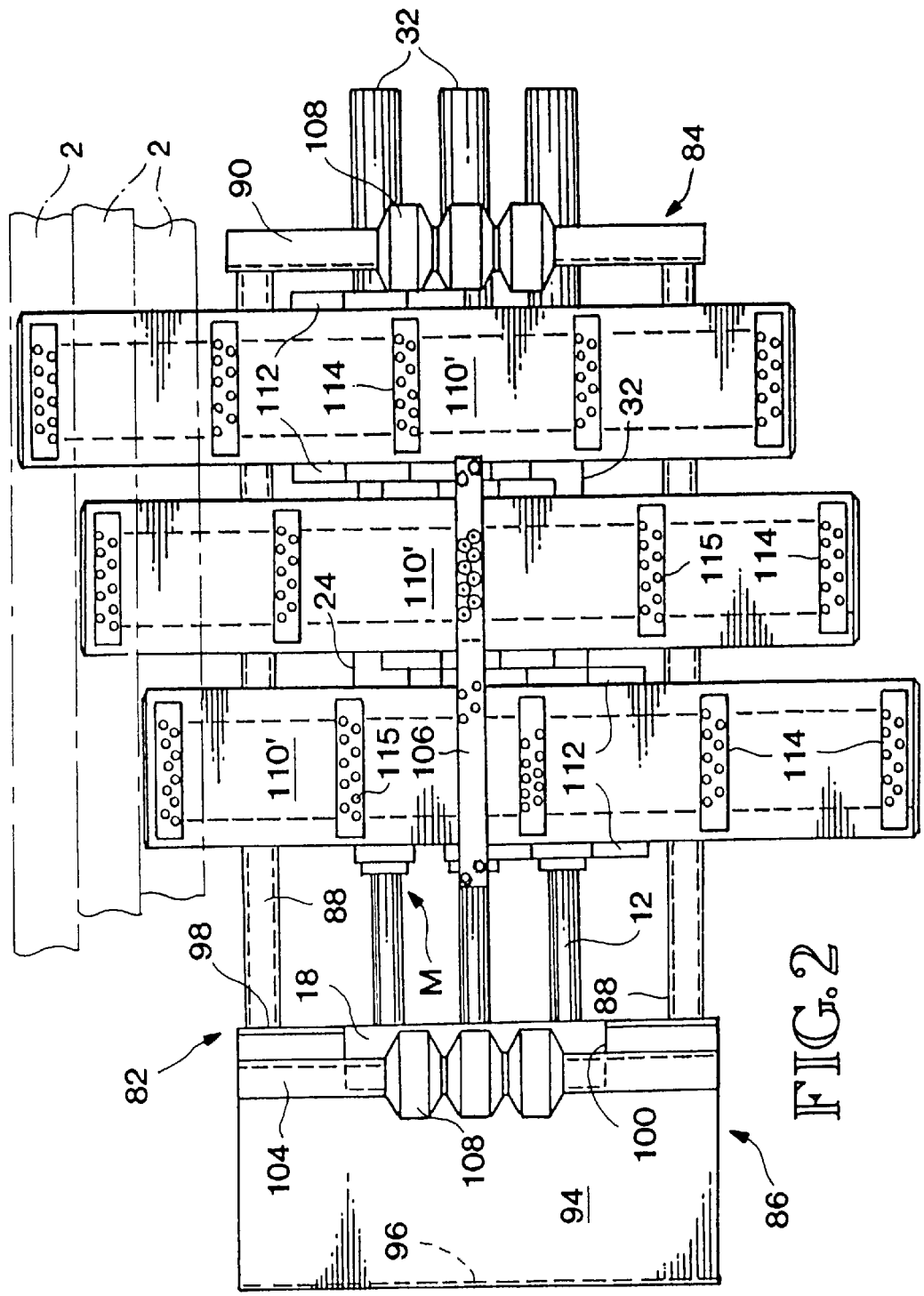

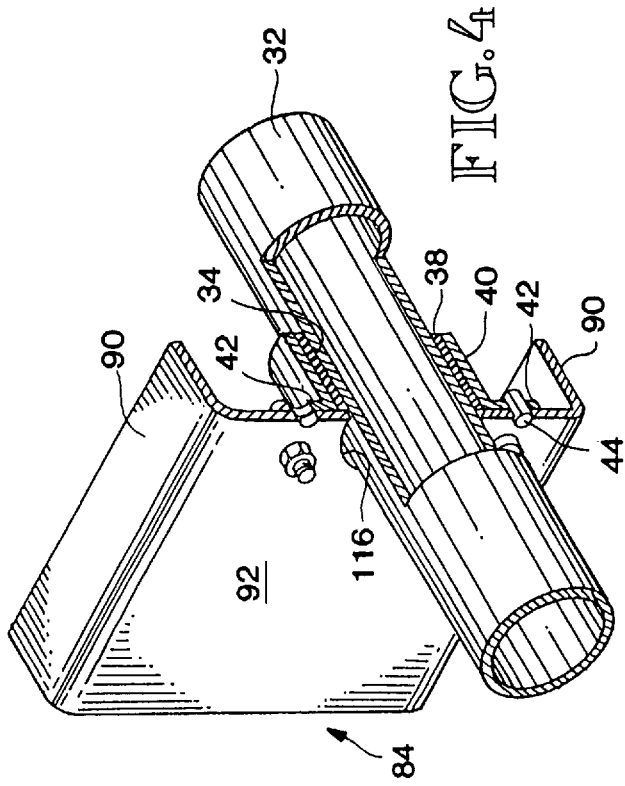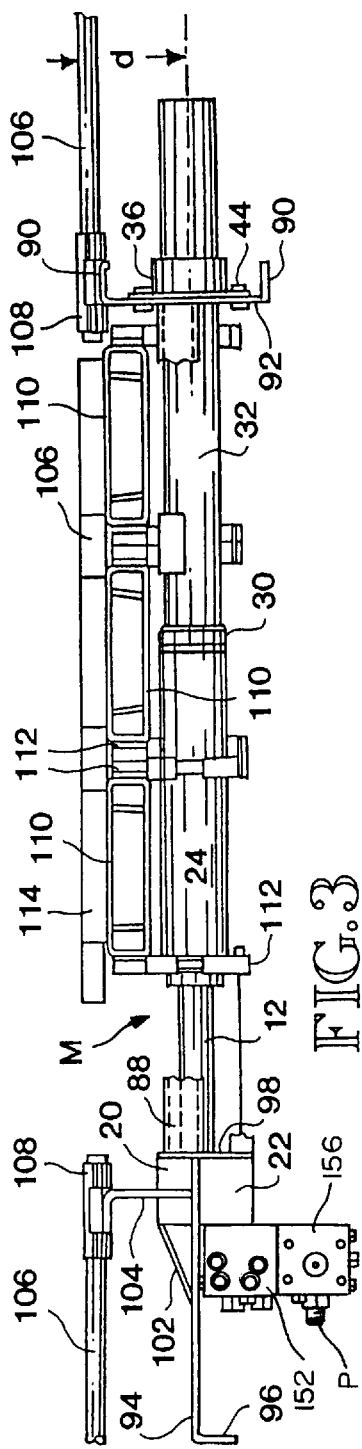

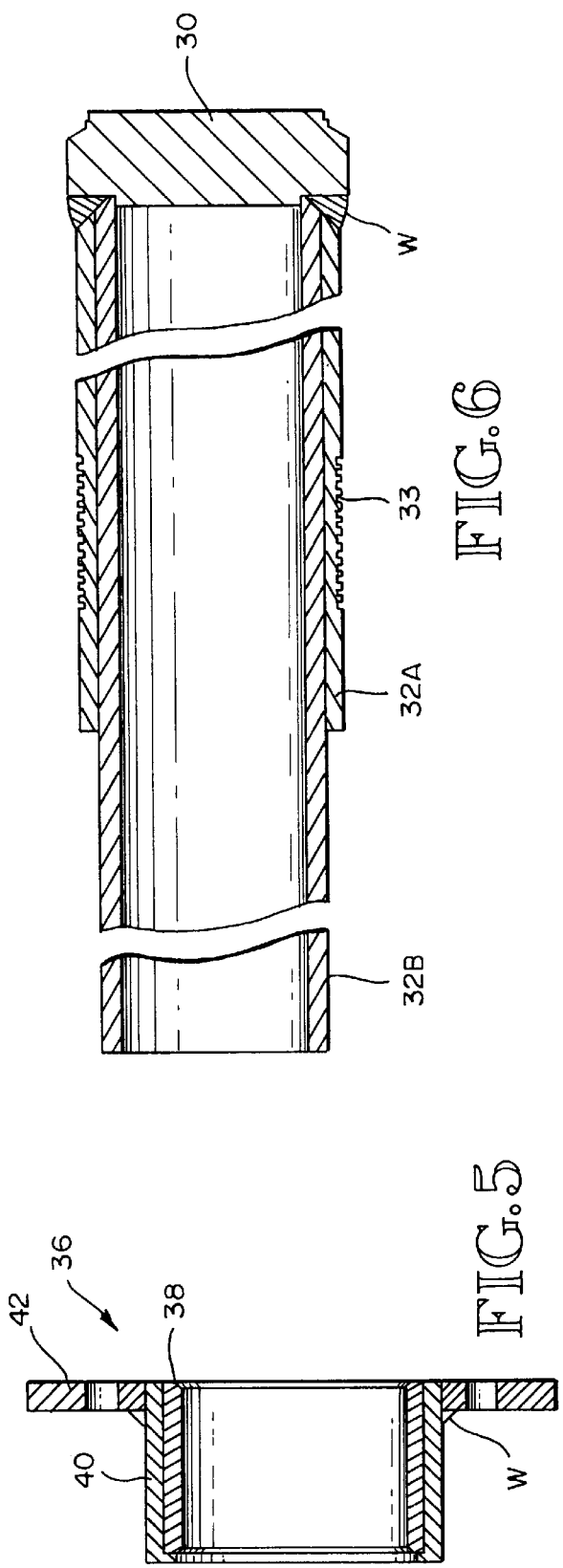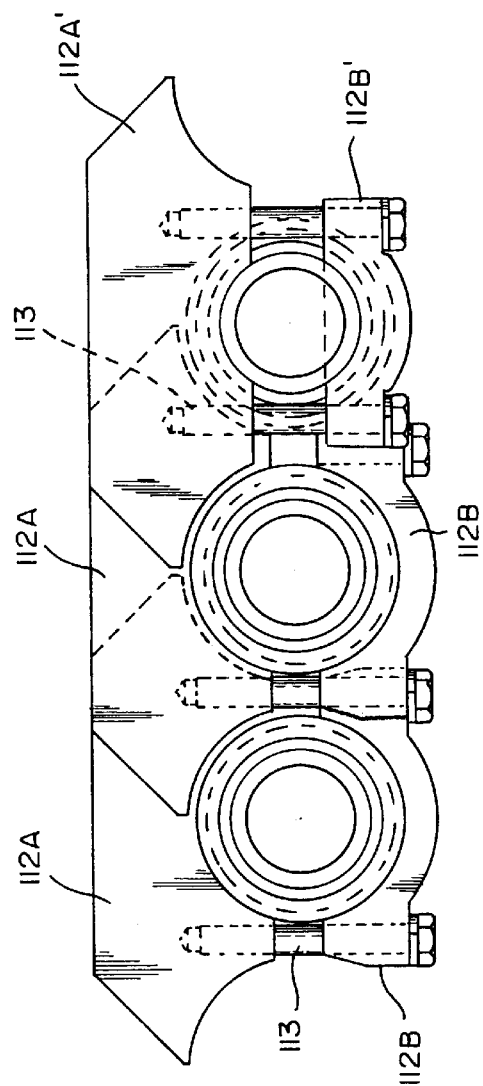

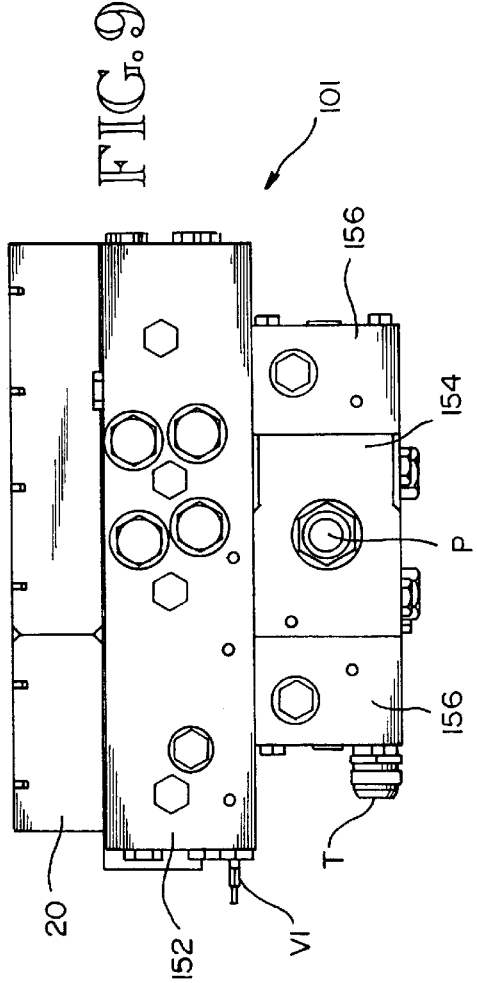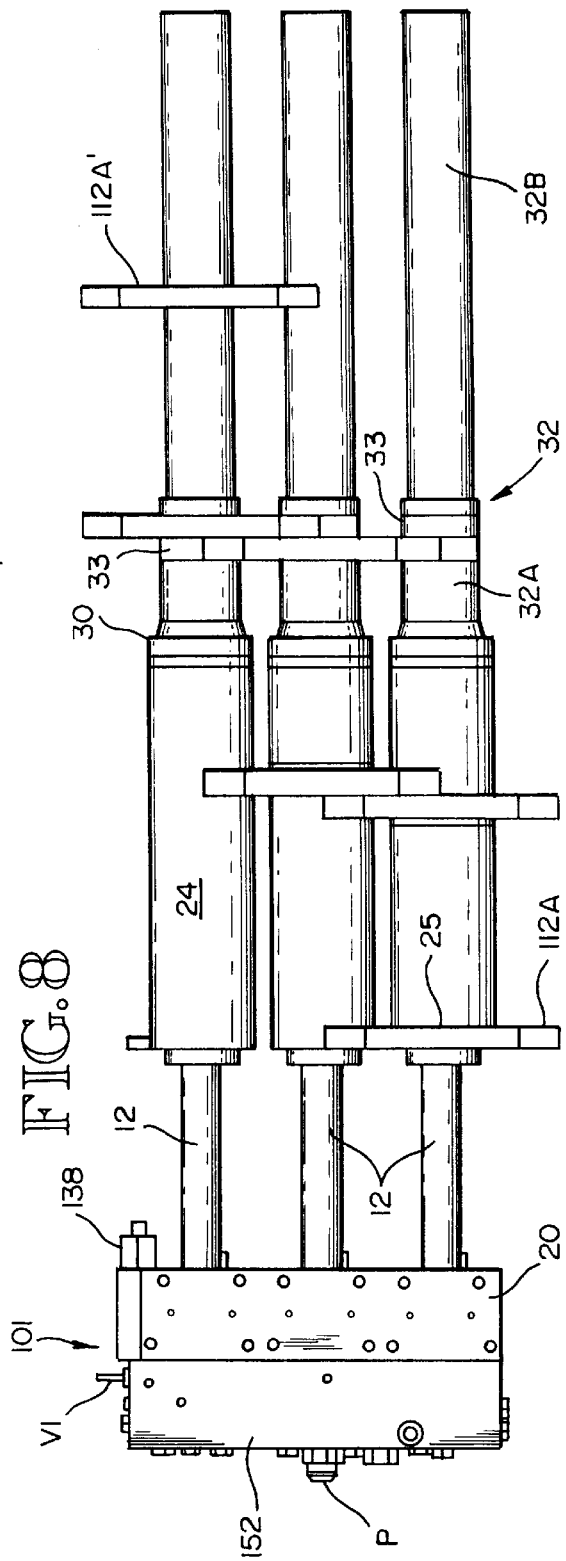

DRIVE ASSEMBLY FOR RECIPROCATING SLAT CONVEYOR

RELATED APPLICATIONS

This application is a continuation-in-part of application Ser. No. 08/571,564, filed Dec. 13, 1995, now U.S. Pat. No. 5,605,221, granted Feb. 25,1997, which is a continuation-in-part of application Ser. No. 08/390,759, filed Feb. 17, 1995, now U.S. Pat. No. 5,482,155, granted Jan. 9, 1996.

TECHNICAL FIELD

This invention relates to reciprocating slat conveyors and drive assemblies therefor. It more particularly relates to a drive assembly having a plurality of piston-cylinder drive units and a manifold structure providing a single external pressure port and a single external return port for operation of the conveyor.

BACKGROUND INFORMATION

Reciprocating slat conveyors are generally known. A common type of conveyor has a plurality of conveyor slats arranged in a plurality of slat sets. A piston-cylinder drive unit is provided for each slat set. A drive beam interconnects each drive unit with the slats in its set. This general arrangement has many variations. The present invention is directed toward providing a conveyor of this type that is easily installed in a structure, has components accessible for maintenance, and can be made in a compact form that is structurally strong. It is also directed toward providing a drive assembly for a reciprocating conveyor.

SUMMARY OF THE INVENTION

According to an aspect of the invention, a drive assembly for a reciprocating slat conveyor comprises a fixed transverse frame member and a plurality of piston-cylinder drive units. Each drive unit has a longitudinally fixed piston component and a movable cylinder component. Each piston component includes an elongated piston rod having an inner end and an outer end, a piston head at its inner end, a ball member at its outer end, and first and second piston fluid passageways. The first passageway extends through the ball member and piston rod from the outer end of the piston component to a first working chamber on one side of the piston head. The second passageway extends through the ball member and piston rod from the outer end to a second working chamber on the opposite side of the piston head. A ball member receiving socket structure is provided for each drive unit. The socket structure includes first and second socket fluid passageways communicating with the first and second piston fluid passageways, respectively. The socket structure is fixed to the transverse frame member. A manifold structure is secured to the socket structures. The manifold structure includes a plurality of internal valves positioned to control connection of the passageways to pressure and return. The valves include a switching valve having a single external pressure port and a single external return port. Each cylinder component has a closed end opposite the ball member. The socket structures and the manifold structure have abutting surfaces forming internal fluid connections therebetween. This allows operation of the conveyor without external fluid ports other than the single pressure port and single return port of the switching valve.

A preferred feature of the invention is a pilot-operated switching valve. When such feature is provided, the drive assembly preferably has a pair of check valves with externally projecting operators positioned to the engaged and moved by the cylinder components as the cylinder components reciprocate relative to the piston components. The switching valve is pilot operated in response to opening and closing of the check valves.

According to another aspect of the invention, the drive assembly described above comprises an elongated drive frame including a pair of fixed longitudinally spaced apart transverse frame members. The socket structures are fixed to one of these transverse frame members. The cylinder component is slidably supported by the other of the transverse frame members. Preferably, each socket structure has a detachable portion that, when detached, permits removal of the corresponding ball member from the socket structure. This detachable connection facilitates installation and maintenance of the drive assembly.

According to another aspect of the invention, a reciprocating slat conveyor comprises an elongated conveyor frame including a pair of fixed longitudinally spaced apart transverse frame members. A plurality of longitudinally extending elongated load engaging conveyor slats are mounted on the conveyor frame and are arranged in a plurality of slat sets. A plurality of drive beams extend transversely of the conveyor slats, centrally of the transverse frame members. Each drive beam is associated with a different set of the conveyor slats. The conveyor also includes a plurality of piston-cylinder drive units, one for each set of conveyor slats and associated drive beam. Each drive unit has a longitudinally fixed piston component fixed to a first of the transverse frame members, a movable cylinder component, and a tubular extension. The tubular extension is connected to the cylinder component and extends endwise from it in a direction opposite the piston component. Each piston component has a piston rod, a piston head, a ball member, and passageways, as described above. Each cylinder component has a closed end opposite the ball end of the piston component. The tubular extension is connected to the closed end. The conveyor further includes socket structures and a manifold structure, as described above. First and second connectors connect a first and a second of the drive beams to the cylinder component and the tubular extension, respectively, of their drive units. A fixed tubular slide bearing is provided for each tubular extension. The bearings are connected to the second transverse frame member. Each tubular extension extends through its tubular slide bearing. In use, the cylinder components, their tubular extensions, the drive beams, and the conveyor slats reciprocate longitudinally relative to the transverse frame members, the fixed piston components, and the fixed tubular slide bearings.

A preferred feature of the conveyor is detachable connections to facilitate installation and maintenance of the conveyor. These detachable connections may include a detachable portion of the socket structure, as described above, and connectors that detachably connect the drive beams to the drive units. In the preferred embodiment, the conveyor has three piston-cylinder drive units, and a third connector connecting a third of the drive beams to both the cylinder component and the tubular extension of its drive unit.

Another preferred feature of the invention is a pair of conduits connecting the ports of the switching valve to an on/off valve mountable remotely from the manifold structure on a structure in which the conveyor is installed. The on/off valve has a pair of quick connect/disconnect couplings connectable to a source of fluid pressure and return, respectively. This arrangement allows the on/off valve to be mounted in a readily accessible position of the structure for quick emergency shutoffs. The quick connect/disconnect couplings allow the separation of the structure in which the conveyor is mounted from the pressure source. This is required, for example, when a trailer in which the conveyor is installed is separated from a tractor that carries the pressure source.

Major advantages of the drive assembly of the invention include its compact structure and the minimization of external fluid connections. The latter helps increase the reliability of the assembly by helping to prevent leaks in the fluid pathways. It also contributes to the easy installation and maintenance of the assembly. Conveyors constructed according to the invention have these advantages and a number of additional advantages. The mounting of a fixed piston component of each drive unit to a transverse frame member of a conveyor frame and the slidable connection of a tubular extension of a movable cylinder component to an opposite transverse frame member enable secure mounting of the drive units and provide a structure for mounting a plurality of drive beams without requiring extension of the length of the cylinder itself. Both the cylinder itself and the tubular extension are available for receiving connectors connecting the drive beams to the drive units. In addition, the combination of the conveyor frame, the mounting arrangement, and the tubular extensions provides a very strong conveyor structure in which each drive unit, including its piston component, cylinder component, and tubular extension, acts as a structural beam to strengthen the conveyor and enhance its capability to convey loads. The arrangement also facilitates maintaining a conveyor structure that is simple, compact, and lightweight.

These and other advantages and features will become apparent from the detailed description of the best mode for carrying out the invention that follows.

BRIEF DESCRIPTION OF THE DRAWINGS

Like reference numerals are used to designate like parts throughout the several views of the drawings, and:

FIG. 1 is a pictorial view of the preferred embodiment of the conveyor of the invention viewed from below.

FIG. 2 is a top plan view of the conveyor shown in FIG. 1.

FIG. 3 is a side elevational view of the conveyor shown in FIGS. 1 and 2 with a longitudinal frame member shown in cutaway.

FIG. 4 is a pictorial view of the tubular extension and bearing mount of FIG. 1 with portions of the tubular extension and bearing mount shown cut away.

FIG. 5 is a sectional view of the bearing mount shown in FIG. 4.

FIG. 6 is a sectional view of the tubular extension and associated cylinder plug shown in FIGS. 1 and 3.

FIG. 7 is an end elevational view of the motors and clamps shown in FIG. 8.

FIG. 8 is a top plan view of the motors, clamps, ball mounts, and manifold shown in FIGS. 1–3.

FIG. 9 is an elevational view looking toward the back side of the manifold and ball block structure shown in FIGS. 1 and 3.

BEST MODE FOR CARRYING OUT THE INVENTION

Figure 10:
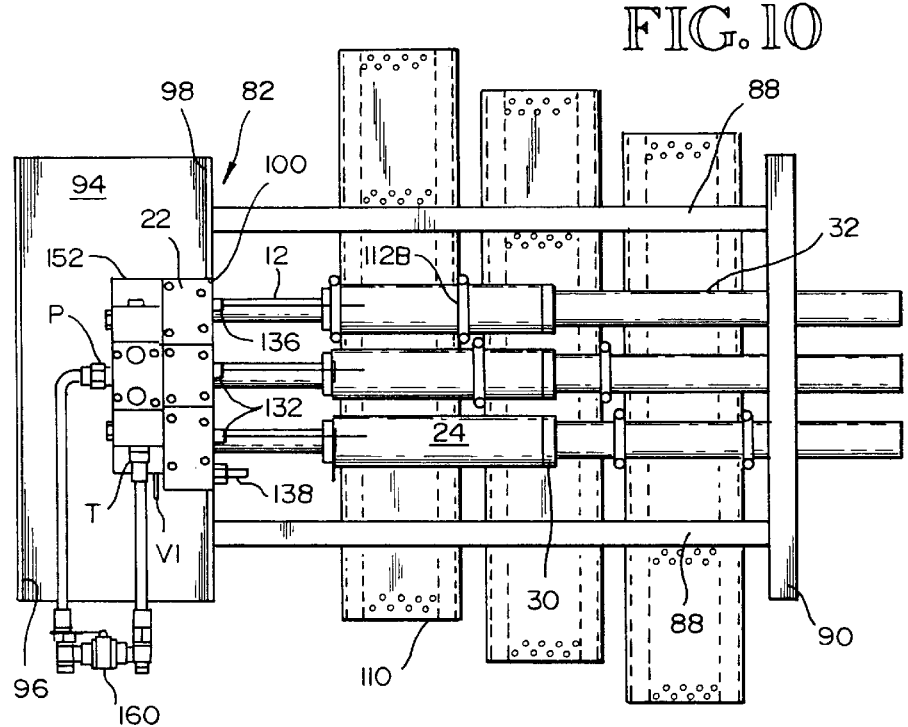
FIG. 10 is a bottom plan view of the conveyor shown in FIGS. 1–3, illustrating hydraulic connections to the switching valve.

The reciprocating floor conveyor of the present invention includes conveyor slats or floor slat members 2 (FIG. 2) that are moved in one direction to advance a load and are retracted in the opposite direction. The floor slat members 2 are divided into three sets. All of the floor slat members 2 are moved in unison in a first direction to advance the load. The floor slat members 2 are then retracted one set at a time in the opposite direction, until all floor slat members 2 are back at a "start" position. The operation is then repeated.

Reciprocating floor conveyors in general utilize various types of drive mechanisms for reciprocating the floor slat members. Examples of drive mechanisms are set forth in my U.S. Pat. No. 5,325,763 and in my U.S. Pat. No. 4,748,893, granted Jan. 7, 1988, and entitled, "Drive/Frame Assembly for a Reciprocating Floor." Drive assemblies include individual drive units that may be linear hydraulic motors, such as those disclosed in my U.S. Pat. No. 5,325,763. The present invention provides an improved drive assembly and an improved conveyor.

The conveyor of the present invention includes a plurality of drive units, each of which is a linear hydraulic motor M. There are preferably three motors M, one for each set of floor slat members 2. Each motor M is mounted to be vertically close to the floor slat members 2, to reduce misalignment of motor M during operation of the conveyor.

Motor M is an extensible-length piston-cylinder drive unit having a longitudinally fixed piston component 6 and a movable cylinder component 8 that moves with the floor slat members 2 in the corresponding set. The piston component 6 includes an outer end portion and an inner end portion. The inner end portion includes a piston head 10. The piston component 6 also includes a piston rod 12 that extends outwardly from the piston head 10. The outer end portion of piston component 6 includes a ball end 14 that is received in a ball socket 16 within a two-part ball block housing 18. The ball block 18 has an upper housing portion 20 and a lower housing portion 22 that are detachably connected and together form the socket 16 to securely hold ball end 14 in place and prevent relative longitudinal movement. The ball end 14 may be removed from the ball block 18 by detaching the lower housing portion 22. By way of example, the ball block 18 may be like that described in my U.S. Pat. No. 5,390,781, granted Feb. 21, 1995, and entitled "Mounting Assembly And Method For Reciprocating Slat Conveyor," or my U.S. Pat. No. 5,427,229, granted Jun. 27, 1995, and entitled "Control System For Reciprocating Floor Conveyor." The ball block 18 mounts to a transverse mounting member 86 that attaches to the main framework of the trailer or bunker.

The cylinder component 8 includes a cylinder barrel 24 mounted to travel on the piston head 10 and having a first end and a second closed end 26. The first end includes a cylinder head 28, through which the piston rod 12 extends. At the second end 26 of cylinder barrel 24 is a cylinder plug 30. An axially-extending tubular extension 32 is attached to the cylinder plug 30 at the second end 26 and travels with the cylinder barrel 24. The structure of the tubular extension 32 is best seen in FIG. 6. It includes first and second tubular portions 32A and 32B, each of which has one end secured to the cylinder plug 30, such as by welding W. Portion 32A concentrically and closely surrounds portion 32B and has a plurality of annular grooves 33 on its outer circumferential surface. Portion 32B extends axially outwardly from and beyond portion 32A. The projection portion 32B of tubular extension 32 has an outer diameter that is about ten to fifteen percent less than the diameter of the cylinder barrel 24. The cylinder plug 30 is welded to the cylinder barrel 24 as well as to the tubular extension portions 32A, 32B.

Referring to FIGS. 1 and 3–5, projecting portion 32B of tubular extension 32 extends through an axial opening 34 of a fixed tubular slide bearing 36. Slide bearing 36 has a tubular bearing member 38, (shown in FIGS. 4–5) which has an inside diameter of approximately 3.05 inches and an outside diameter of approximately 3.5 inches, and which surrounds the tubular extension 32. The inner surface of bearing member 38 provides a bearing surface for slidably supporting tubular extension 32. An annular housing 40 surrounds the bearing member 38. The inside diameter of the housing 40 is approximately 3.5 inches, and the outside diameter is approximately 4.0 inches. The relatively small radial thickness of the bearing 36 helps minimize the vertical distance between the longitudinal axis of the motor M and the floor slat member to which the motor M is attached.

Still referring to FIGS. 1 and 3–5, the housing portion 40 of each slide bearing 36 has two opposite vertically extending flanges 42. These flanges 42 are secured to a transverse mounting member 84 by a plurality of bolts 44. The transverse mounting member 84 is secured to a portion of the framework of the structure in which the conveyor is installed (not shown). Slide bearing 36 guides tubular extension 32 so as to restrict cylinder barrel 24 to linear, reciprocating movement. Tubular extension 32 in conjunction with slide bearing 36 also provides structural support to motor M.

Figure 12:
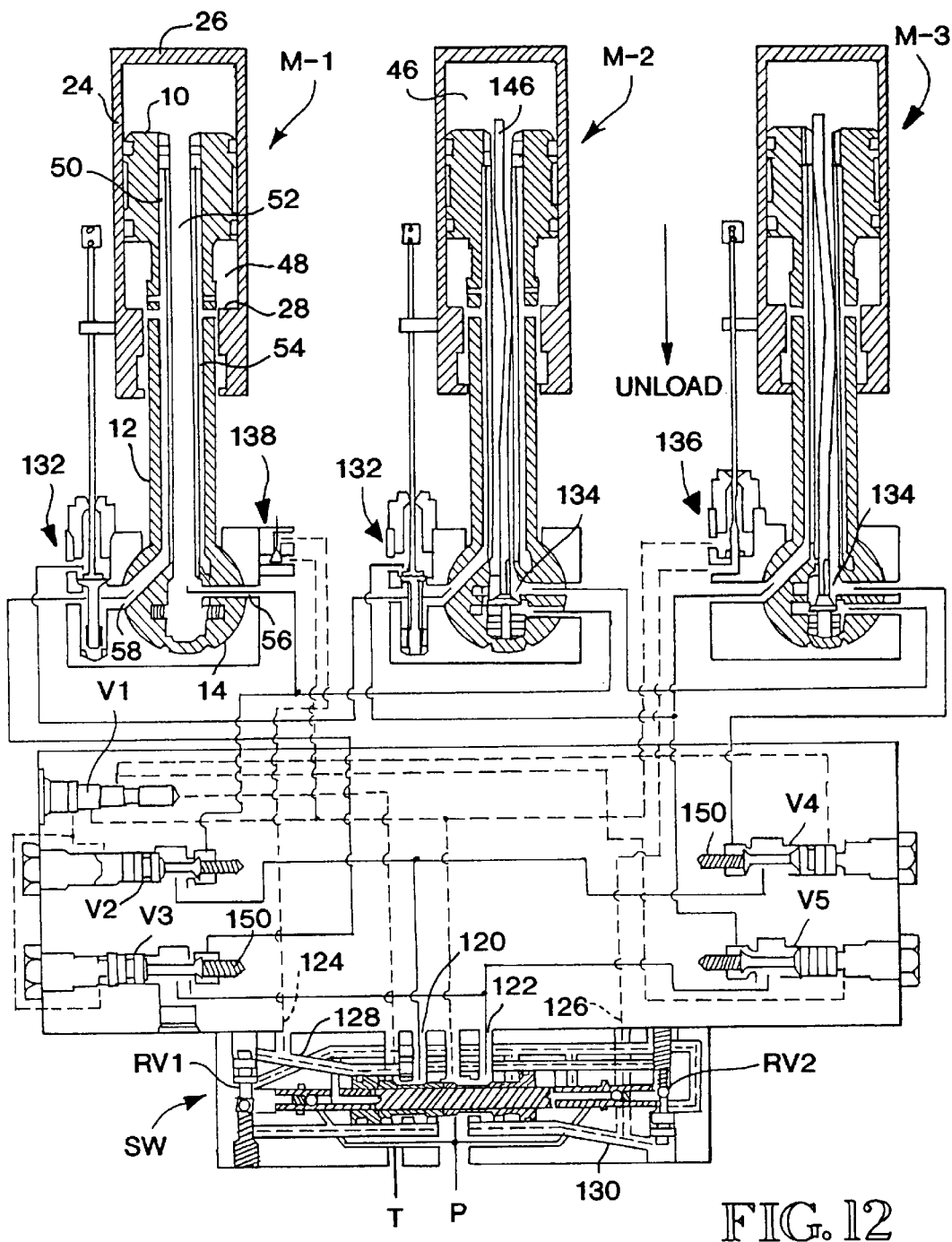
FIG. 12 is a schematic view of a control system for the drive units of FIGS. 1–4.
Figure 13:
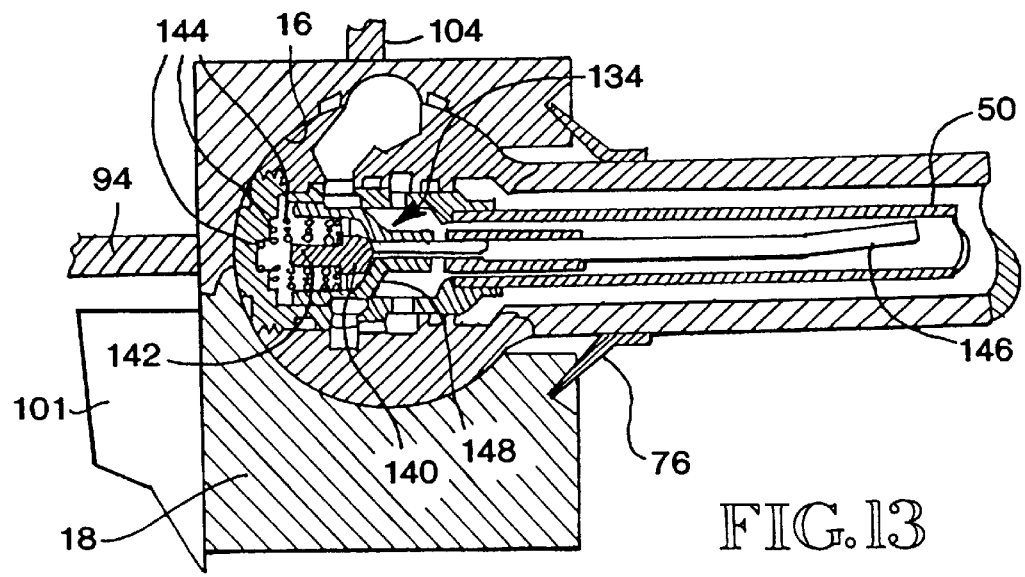
FIG. 13 is an enlarged partial cross-sectional view of one of the drive units of FIGS. 1, 3, and 12 depicting the internal check valve in its fully seated position.
Figure 14:
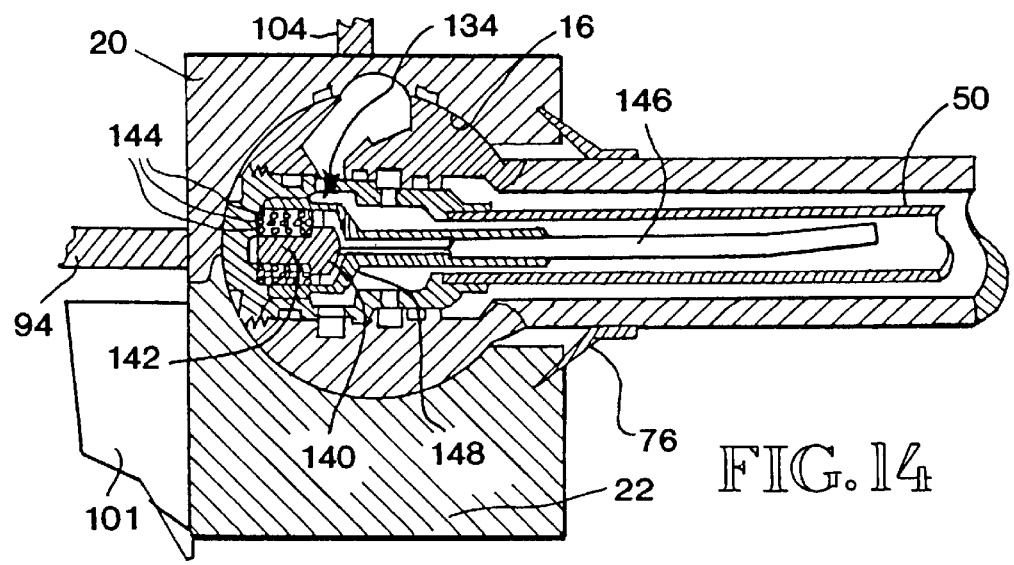
FIG. 14 is a view like FIG. 13, except that the valve is in its fully open position.

FIGS. 12–14 show the inner portions of motor M. These portions of the drive unit are similar to those shown in my U.S. Pat. No. 5,193,661, granted Mar. 16, 1993, and entitled "System of Linear Hydraulic Motors." However, in the patent, the cylinder end of the motor is shown and described as being attached solely to a floor member. In accordance with the preferred embodiment of the present invention, both ends of the motor M are attached to and vertically restrained by mounting structures that are secured to the framework. The motor M, including the tubular extension 32, forms a structural beam that supports the floor member attached thereto and efficiently transmits loads created by operation of the conveyor to the framework.

Figure 15:
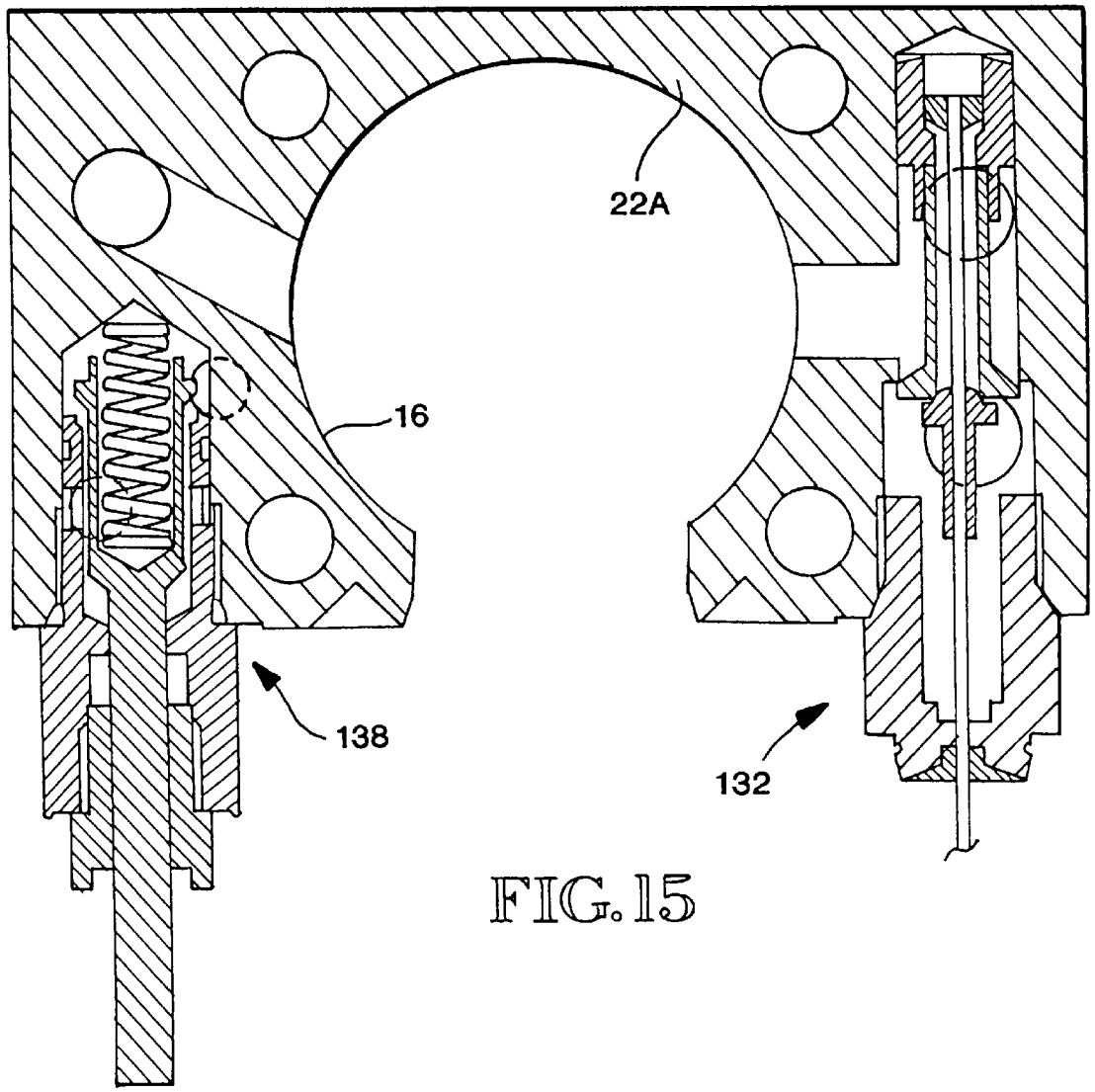
FIGS. 15 and 16 are enlarged sectional views showing the push, pull check valves of FIG. 12.
Figure 16:
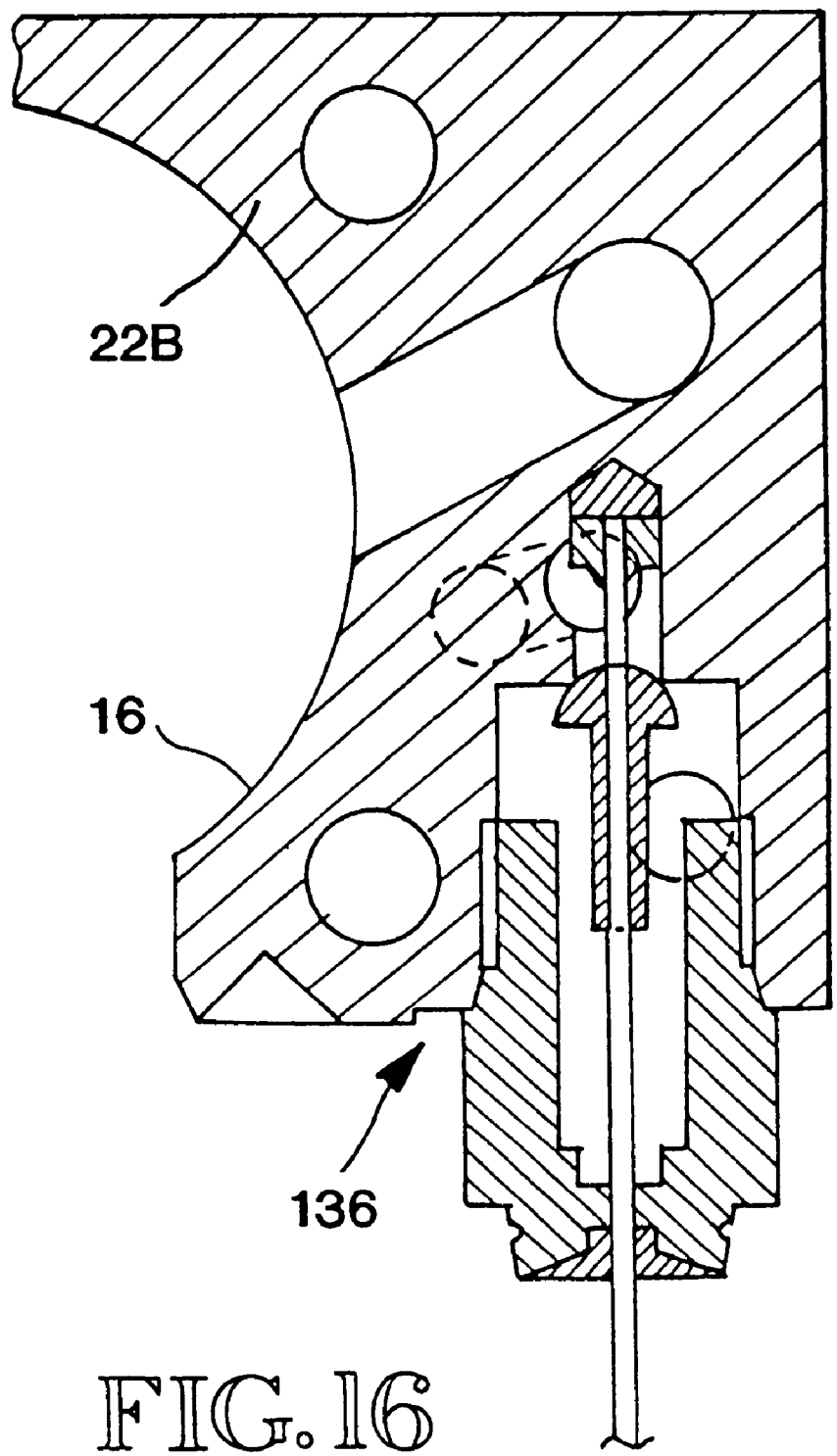

The piston head 10 is received in the cylinder barrel 24 and slidably and sealingly engages the inner cylindrical sidewall of the cylinder barrel. A first cylindrical working chamber 46 and a second annular working chamber 48 are defined between the piston head 10 and the cylinder plug 30, and the piston head 10 and the cylinder head 28, respectively. An axial passageway extends through the piston rod 12 to supply hydraulic pressure to the working chambers 46, 48. A center tube 50 divides the axial passageway into a center passageway 52 and an annular passageway 54 surrounding the center passageway 52. These passageways 52, 54 communicate with working chambers 46, 48, respectively. They also communicate with generally radial passageways 56, 58 (FIG. 12) through the ball end 14 of the piston component. Radial passageways 56, 58 are in communication with passageways in the lower housing portion 22 of the ball block 18 (FIGS. 12, 15, and 16). The passageways in the ball block housing portion 22 are connected to hydraulic conduits formed in a manifold structure 101 for selectively connecting the working chambers 46, 48 to hydraulic pressure and return. The control system and the operation of the motors M are described further below.

Figure 18:
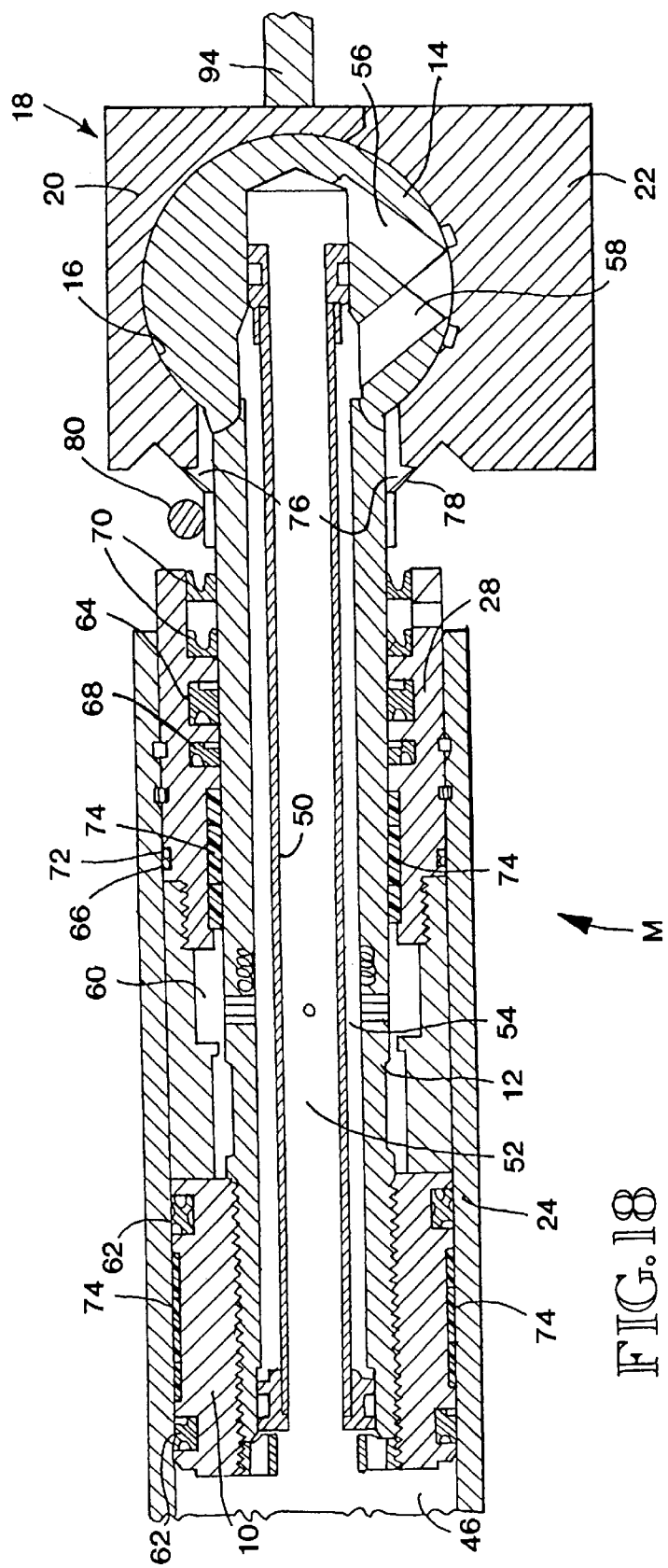
FIG. 18 is an enlarged partial cross-sectional view of one of the drive units of the preferred embodiment, illustrating a plurality of seals and wear rings.

A valve ring, which is used to provide an end of stroke cushion for motor M, may be provided in a space shown at 60 (FIG. 18). The valve ring is preferably like that which is described in my U.S. Pat. No. 5,313,872, granted May 24, 1994, and entitled "End of Stroke Cushion for A Linear Hydraulic Motor," and will not be further discussed herein.

Referring to FIG. 18, piston head seals 62, cylinder head/rod seal 64, O-ring 66, buffer seal 68, and wipers 70 are provided in motor M to prevent hydraulic fluid from escaping from the working chambers 46, 48 and leaking from the cylinder. In preferred form, the piston head seals 62, the buffer seal 68, and the wipers 70 are polyurethane seals. By way of example, and not to be limitive, the seals may be PARKER part numbers P4700A90, made by the Parker Hannifin Corporation, Salt Lake City, Utah, USA. The cylinder head/rod seal 64 may be like PARKER part no. P4300A90 and also made of polyurethane. The O-ring 66 is also polyurethane, and preferably includes a back-up ring 72. Back-up rings 72 may also be used with the piston head seals 62 and the cylinder head/rod seal 64. The back-up rings may be made of Nylatron (trademark).

A plurality of wear rings 74, which are essentially cylindrical sleeves with a longitudinal slit to aid installation, may be employed between the inner sidewall of the cylinder barrel 24 and the piston head 10. Wear rings 74 may also be used between the piston rod 12 and the cylinder head 28. In preferred form, three wear rings are adjacently arranged and installed in each location. An example of a suitable material for the wear rings is a material comprising polyester, glass, and/or graphite in a standard resin matrix, such as the material sold under the trademark Orkot TLG-S. The inside diameter of each wear ring 74 is approximately 1¾ inches, and the ring 74 is approximately 0.120–0.125 inch thick and approximately 0.500–0.510 wide. Use of the wear rings 74 hinders lateral movement of motor M during operation and protects the piston and cylinder components from wear. The wear rings 74 strengthen and stiffen motor M to enhance its functioning as a structural beam. In addition, the wear ring 74 is relatively inexpensive to replace.

A rod dust seal 76 may be used to seal the outer end of the passageway in the ball block 18 through which the piston rod 12 projects. The dust seal 76 is an annular member surrounding the piston rod 12 and has an angled flange 78 that deflects dirt and dust from entering the ball block. The dust seal 76 may be held in place around the piston rod 12 via a hose clamp 80, as shown in FIG. 18.

In the preferred embodiment, there are a relatively small number of motors M (preferably three) mounted on a compact, lightweight frame 82. The frame 82 includes a pair of longitudinally-spaced transverse mounting members 84, 86 connected by two laterally-spaced longitudinal frame members 88. The four frame members 84, 86, 88 define a rectangular window in which the motors M are mounted. The first transverse mounting member 84 is a C-shaped channel beam with opposite horizontal flanges 90 connected by a web 92. The flanges 90 extend from the web 92 away from the second transverse mounting member 86. The slide bearings 36 are secured to the web 92 of the first transverse mounting member 84 so that the tubular extensions 32 are supported and vertically restrained by the mounting member 84. The ball end 14 of the piston component 6 of each motor M is received in a ball block 18 that is secured to the second transverse mounting member 86. This positions each of the motors M between the opposite transverse mounting members 84, 86, except that the ball end 14 overlaps the member 86 and the outer end of the tubular extension 32 projects through the mounting member 84. The motors M are also positioned between the longitudinal frame members 88 to position them in the window defined by the frame 82.

Each of the transverse mounting members 84, 86 forms a structural beam and is secured to the framework of a structure in which the conveyor is installed to transmit conveyor operational loads to the framework. Referring to FIGS. 1–3, 10, and 11, transverse mounting member 86 includes a horizontal plate 94 with opposite laterally extending flanges 96, 98. The outer flange 96 extends downwardly from the outer edge of the plate 94. The inner flange 98 extends both upwardly and downwardly from the inner edge of the plate 94. A center cutout 100 is provided in the plate 94 and inner flange 98 to receive the ball blocks 18. A manifold structure 101 is secured to the back surfaces of the lower housing portions of the ball blocks 18 to connect the ball ends 14 to hydraulic pressure and return through the ball blocks 18. A laterally extending diagonal plate 102 is angled downwardly and outwardly from the top of the ball blocks 18 to the plate 94 and provides a bracing gusset to reinforce the connection of the motors M to the transverse mounting member 86. An upside down L-shaped member 104 is positioned longitudinally between inner flange 98 and brace 102 and extends laterally along the top of plate 94 and the tops of the ball blocks 18 from one lateral edge of the plate 94 to the opposite lateral edge. The member 104 extends vertically upwardly from the plate 94 and ball blocks 18 and then horizontally outwardly toward the outer flange 96.

The upper horizontal leg of the member 104 supports and is secured to a plurality of longitudinal guide beams 106. The upper horizontal flange 90 of the transverse mounting member 84 also supports and is secured to a plurality of longitudinal guide beams 106 that are aligned with the guide beams 106 on the L-shaped member 104. Bearings 108 are positioned on the guide beams 106 to slidably support the floor slat members of the conveyor. The configurations of the bearings 108 and floor slat members 2 are not a part of the present invention. They may be like various known bearing and slat member configurations.

Referring to FIGS. 1–3, 10 and 11, a plurality of longitudinally spaced transverse drive beams 110, 110' are mounted on and above the motors M, one drive beam for each motor M. During operation of the conveyor, the drive beams 110, 110' travel longitudinally between the transverse mounting members 84, 86. The drive beams may be like those disclosed in my U.S. Pat. No. 5,193,661, granted Mar. 16, 1993, and entitled "System of Linear Hydraulic Motors," or my U.S. Pat. No. Re. 35,022, reissued Aug. 22, 1995, and entitled "Reduced Size Drive/Frame Assembly for a Reciprocating Floor Conveyor." The latter type of drive beam 110 is shown in FIG. 3. The drive beams may be modified to have a C-shaped cross section, like the drive beams 110' shown in FIGS. 1 and 2. Whatever the configuration of the drive beams, the frame 82, motors M, and drive beams 110, 110' form a compact lightweight assembly that may be easily installed in a structure.

The assembly includes connectors that detachably secure the drive beams 110, 110' to the motors M. In preferred form, the connectors comprise two clamps 112 for each drive beam 110, 110'. The clamps may be like those disclosed in my aforementioned U.S. Pat. No. Re. 35,022 or in my U.S. Pat. No. 5,433,312, granted Jul. 18, 1995, and entitled "Drive Assembly for Conveyor Slats of Reciprocating Floor Conveyor." The clamps 112 preferably are similar to those shown in the reissue patent.

Referring to FIGS. 1, 3, 7, and 8, each clamp 112 has an upper part 112A, 112A' that is attached to the respective drive beam 110, 110' and is secured by bolts 113 to a lower clamp part 112B, 112B' that cradles the movable cylinder component of the motor M. The arrangement of the clamps is shown in FIGS. 1–3 and 8. For a first one of the drive beams 110, 110', both clamps 112 connect the drive beam 110, 110' to the cylinder barrel 24 of the cylinder component 8 of the respective motor M. A second drive beam 110, 110' is attached to its motor M by clamps 112 that engage the cylinder barrel 24 and tubular extension 32, respectively. For the third drive beam 110, 110', both clamps 112 engage the tubular extension 32. This arrangement makes use of substantially the full length of the cylinder component 6. For each motor M, one of the clamps 112 engages annular grooves 33, 25 (FIG. 8) on the tubular extension 32 or the cylinder barrel 24 to prevent relative axial movement between the motor M and the drive beam 110, 110'. The parts 112A' and 112B' of the outer clamp on the third drive beam 110, 110' are modified in size to engage the reduced diameter of tubular extension portion 32B. The tubular extension 32 performs a plurality of functions. It provides a means for restraining the end of the motor M opposite the ball end 14. It also serves as a mount for one of the drive beams 110, 110' and a portion of another drive beam 110, 110'.

The drive beams 110, 110' perform the known function of transmitting longitudinal movement of each motor M to a set of floor slats. The floor slats are divided into sets and groups, with one set of floor slats for each motor M and its transverse drive beam 110, 110'. Each group of floor slats includes a plurality of adjacent floor slats, three in the embodiment shown in FIGS. 1–3, 8, and 10–12, one floor slat from each set of floor slats. The slats in each set are connected to their respective drive beams 110, 110' above the motors M by means of connectors. FIGS. 2 and 3 show an example of a suitable type of connector 114. There is one connector 114 for each floor slat. The connector 114 is attached to its drive beam 110, 110' and floor slat by suitable means, such as by welding or by a plurality of fasteners 115, shown in FIG. 2.

The flanges 42 of the slide bearing housing portion 40 are secured to the web 92 of the transverse mounting member 84 by means of bolts 44. A circular opening 116 extends through the web 92 and is aligned with the axial opening through the bearing 36 to receive the tubular extension 32 therethrough, as best seen in FIG. 4.

In the illustrated embodiment, the vertical distance d between the longitudinal centerline of the motor M and the floor slat is kept to a minimum in order to help minimize operational loads on the frame 82 and ensure smooth operation of the conveyor. Referring to FIG. 3, the vertical distance d between the top of the guide beam 106 and the longitudinal centerline of the motor M is necessarily larger, for a given diameter motor, because of the presence of the transverse drive beams 110, 110' between the floor slats and the motor M. However, the distance d is still relatively short. For example, in the illustrated embodiment, the distance d is approximately four and three-quarter inches. The vertical distance between the centerline and the top of a floor slat member (not shown in FIG. 3) would be slightly larger.

FIG. 12 illustrates the currently preferred control system for use in the preferred embodiment of the conveyor. The control system moves the conveyor slats in the manner described in my U.S. Pat. No. 5,165,524. A load may be conveyed in either of two opposite longitudinal directions. During a conveying operation, the motors are moved simultaneously in the conveying direction to convey the load. Then, the motors are returned to their starting positions, one at a time. After all three motors have returned to their starting positions, the operation is repeated until the load has reached its desired position.

The system shown in FIG. 12 includes a switching valve SW that is preferably of the type disclosed in my U.S. Pat. No. 5,622,095, granted Apr. 22, 1997, and entitled "Hydraulic Drive and Control System," the disclosure of which is incorporated herein by reference. The valve SW has two inlet ports connected to pressure P and tank (return) T, respectively. In operation, the valve SW has two positions in which it selectively connects first and second outlet ports 120, 122 to pressure and return. The two valve positions correspond to two positions of a control rod that is shifted back and forth hydraulically. Relief valves RV1, RV2 permit the shifting of the control rod. Pressure is selectively supplied to valves RV1, RV2 via first and second pilot passageways 124, 126. The operation of the switching valve SW is described in detail in my aforementioned U.S. Pat. No. 5,622,095. The main difference between the valve disclosed therein and the valve SW shown in FIG. 12 is that the passageways that interconnect valves RV1, RV2 are internal passageways, rather than external conduits. The interconnecting passageways are shown in FIG. 12 and are given the reference numerals 128, 130. The provision of the passageways in the form of internal passageways or as external conduits, in itself, has no effect on the operation of the switching valve SW. However, the internal passageways 128, 130. help achieve the goal of minimizing the external connections in the control system. Passageways from pressure P and return T to the pressure and return ports of a valve V1 in manifold 101 are provided through valve SW. In order to facilitate understanding of the control system, in FIG. 12, pilot lines are shown as broken lines, and lines connecting to the working chambers 46, 48 of the motors are represented by solid lines.

Referring to FIG. 12, motors M-1 and M-2 each have a pull valve 132, shown in FIG. 15. The pull valve 132 preferably has the structure disclosed in my U.S. Pat. No. 5,255,712, granted Oct. 26, 1993, and entitled "Check Valve Pull Assembly." Motors M-2 and M-3 each have an internal check valve 134. In addition, there are a pull valve 136 on motor M-3 and a push valve 138 on motor M-1. These valves 136, 138 control the pilot lines 124, 126 to switching valve SW. The valves 136, 138 preferably have the structure shown in FIGS. 15 and 16. The lower housing portions of the ball blocks are designated 22A, 22B, respectively, in FIGS. 15 and 16 to reflect the modifications of the ball block housing portions that must be provided to accommodate the differences in the pull and push valves. Each pull, push valve 132, 136, 138 has an externally projecting operator positioned to be engaged and moved by the respective cylinder component 8 as the component 8 moves relative to its piston component 6. The illustrated valve structures are currently preferred, but the structures may be varied without departing from the spirit and scope of the invention.

The internal check valves 134 have the type of structure disclosed in my U.S. Pat. No. 5,427,229. The structure is modified by substituting a secondary valve plug 140 with a stem 142 for the ball valve element shown in the patent. In addition, there are three biasing springs 144 to provide more biasing force. Each of the springs 144 engages the secondary valve plug 140. The structure of the internal check valve 134 is best seen in FIGS. 13 and 14. Its operation is essentially the same as the operation of the check valve disclosed in U.S. Pat. No. 5,427,229. The valve 134 is biased closed by the springs 144. It may be opened by pressure or by a mechanical push exerted by wire rod 146. FIG. 13 shows both the secondary valve plug 140 and the main valve element 148 in their seated positions. FIG. 14 shows both valve elements 140, 148 in their unseated positions.

Figure 17C:
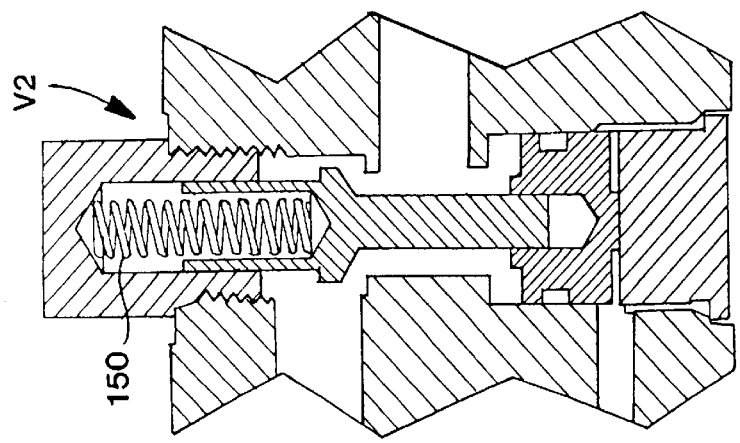
FIGS. 17A, 17B, and 17C are enlarged sectional views illustrating the pilot-operated control valve of FIG. 12.
Figure 17B:
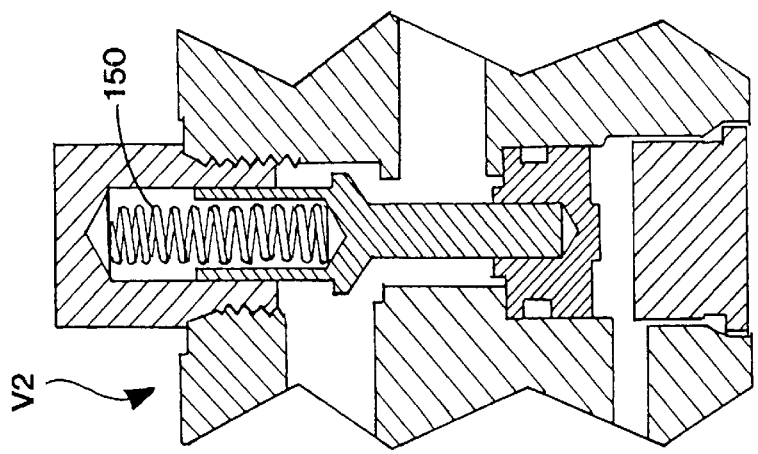
Figure 17A:
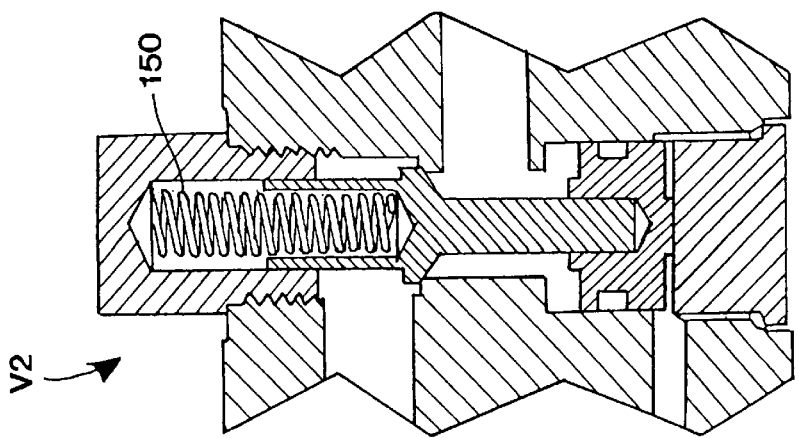

Still referring to FIG. 12, the control system also includes a four-way, two-position directional control valve V1 that determines the conveying direction. The valve V1 is manually operated and has the structure disclosed in my U.S. Pat. No. 5,427,229. The valve V1 has a pressure port, a return port, and two outlet ports that communicate with the pilot chambers of four pilot-operated control valves V2, V3, V4, V5. These four valves are held open by pilot pressure. During an unload operation to convey a load in the direction indicated by the arrow in FIG. 12, valves V2 and V3 are held open by pilot pressure and valves V4 and V5 have their pilot chambers connected to return and are biased closed by springs 150. The open and closed positions of the valves are reversed during a load operation. FIGS. 17A, 17B, and 17C show valve V2 in a closed position, a piloted open position, and an open position, respectively.

In operation of the system to convey a load in the unload direction, pressure is supplied to the working chambers 48 of the motors through open valve V3 to move all three motors M-1, M-2, M-3 simultaneously in the unload direction. Pressure is communicated from valve V3 through the valve chamber of pull valve 132 on motor M-1 into working chamber 48 of motor M-1. The pressure in the valve chamber also opens the pull valve 132 so that pressure is supplied through the opened valve 132 and a conduit into motor M-2 through the valve chamber of its pull valve 132. Pressure is similarly communicated to motor M-3 from motor M-2. The connection of motor M-3 to return via valve V4 is blocked by the closing of valve V4. Therefore, the connection to return must be made through the internal check valve 134 of motor M-3, which is opened by return pressure, through return pressure opened internal check valve 134 in motor M-2, and then through pilot pressure opened valve V2. The connection to return of motor M-1 is unrestricted. However, the transverse drive beams of the system have abutments, which prevent motor M-1 from moving prior to motors M-2, M-3 and motor M-2 from moving prior to motor M-3. Thus, all three motors move simultaneously away from their start positions in the unload direction.

On the return stroke, motor M-1 is supplied with pressure through open valve V2. The connection to return is provided through open valve V3. Movement of the other two motors is blocked by the closing of the pull valves 132. At the end of the return stroke of motor M-1 back to its start position, the pull valve 132 of that motor is opened to provide a connection to return for motor M-2. Motor M-3 is similarly connected to return by the completion of the stroke of motor M-2.

The operation of the system to convey in the load direction is basically the reverse of the unload operation. In both load and unload modes of operation, valves V3 and V5 provide sequencing of movement of the motors in the forward direction, i.e. in the load direction. Valves V2 and V4 provide sequencing of movement in the rearward direction.

The goal of the present invention is to provide a reciprocating slat conveyor that is compact and structurally strong, is reliable in operation, and is easily installed in a structure and maintained. A major feature of the invention that contributes to the achievement of this goal is the inclusion in the drive assembly of a compact structure for connecting the conveyor drive to fluid pressure and return with a minimum number of external connections to help minimize the potential for leakage of pressurized fluid.

The manifold structure 101 referred to above is best seen in FIGS. 1, 3, and 8–11. The structure 101 includes a main manifold housing 152 that is secured to the lower housing portions 22 of the ball blocks 18. It also includes the housing for the switching valve SW. The switching valve housing has a center portion 154 and opposite end portions 156. The center portion 154 houses the control rod of the switching valve SW, and the end portions 156 house the relief valves RV1, RV2. The main housing portion 152 abuts and is secured to the back surfaces of the ball block housing portions 22. The switching valve housing portions 154, 156 are secured together in an abutting relationship and abut and are secured to the bottom face of the main housing 152. Valves V1, V2, V3, V4, V5, shown in FIG. 12, are formed internally in the main housing 152. Push pull valves 132, 136, 138 are internally housed in the ball block housing portions 22 with only their externally extending operators projecting therefrom. The switching valve SW has a single external pressure port P and a single external return port T, shown in FIG. 12. Other than these two ports, all of the fluid connections in the manifold/ball block/drive unit arrangement are internal. The internal connections are formed through the abutting surfaces of the ball block portions 22 and the manifold portions 152, 154, 156. These internal connections have a greatly reduced potential for leakage as compared to external port connections.

Figure 11:
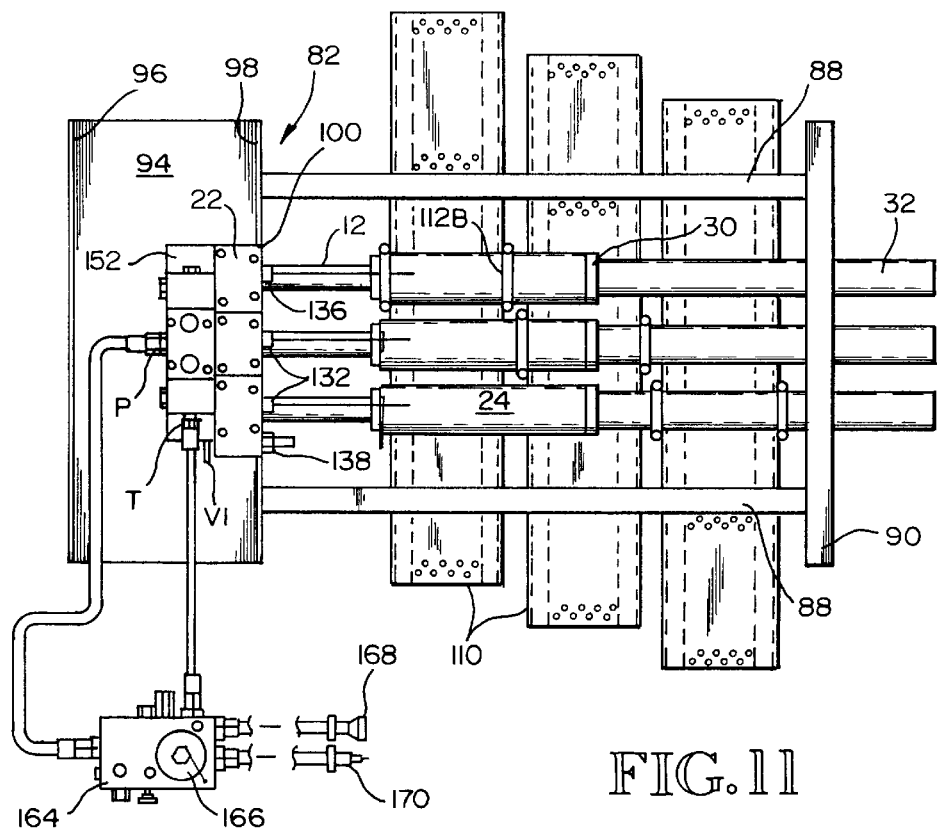
FIG. 11 is like FIG. 10, but shows an alternate hydraulic emergency shutoff.

FIGS. 10 and 11 illustrate the manner in which the manifold structure 101 is connected to pressure and return. A pair of conduits connect the ports P, T of the switching valve SW to an on/off valve. In FIG. 10, the on/off valve is shown as a ball valve 160. In FIG. 11, the on/off valve is mounted in a filter block 164 that includes a filter 166 as well as the on/off valve. The valve may take various known forms. Preferably, the valve and filter 166 are part of the type of circuit disclosed in FIGS. 2–4 of U.S. Pat. No. 5,758,683, granted Jun. 2, 1998, the disclosure of which is incorporated herein by reference. The valve elements and fluid interconnections of the circuit are formed internally in the block 164 to limit the external connections to the two inlet ports communicating with the switching valve SW and the two outlet ports communicating with the pressure source and return. In the arrangement of either FIG. 10 or FIG. 11, the on/off valve is mountable remotely from the manifold structure 101 on a structure in which the conveyor is installed. For example, when the conveyor is installed in a trailer, the on/off valve 160 or valve/filter block 164 may be mounted on the outside of the trailer adjacent to a coupling for a tractor.

The on/off valve is provided with a pair of quick connect/disconnect couplings 168, 170 (not shown in FIG. 10) connectable to return and a source of fluid pressure, respectively. These connections may be, for example, a tank or reservoir and a pump carried by the tractor. As shown, the couplings 168, 170 are provided on flexible conduits extending from the valve 160 or block 164. The provision of the couplings 168, 170 provides a quick connect/disconnect between the conveyor and the tractor to facilitate installation of the conveyor and subsequent connection and disconnection of the conveyor when required, such as when the trailer is to be disconnected from the tractor. The location of the on/off valve on the exterior of the trailer in a readily accessible position provides a convenient emergency shutoff for the conveyor.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents.

What is claimed is:

1. A drive assembly for a reciprocating slat conveyor, comprising:

a fixed transverse frame member;

a plurality of piston-cylinder drive units; each said drive unit having a longitudinally fixed piston component, and a movable cylinder component; each piston component including an elongated piston rod having an inner end and an outer end, a piston head at its inner end, a ball member at its outer end, and first and second piston fluid passageways, said first piston fluid passageway extending through said ball member and said piston rod from said outer end to a first working chamber on one side of the piston head, and said second piston fluid passageway extending through said ball member and said piston rod from said outer end to a second working chamber on the opposite side of the piston head;

a ball member receiving socket structure for each drive unit, said socket structure including first and second socket fluid passageways communicating with said first and second piston fluid passageways, respectively, and said socket structure being fixed to said transverse frame member; and a manifold structure secured to said socket structures and including a plurality of internal valves positioned to control connection of said passageways to pressure and return; said valves including a switching valve having a single external pressure port and a single external return port, and four pilot-operated control valves positioned between said passageways and said switching valve to provide sequencing of movement of said cylinder components;

each said cylinder component having a closed end opposite said ball member; and said socket structures and said manifold structure having abutting surfaces forming internal fluid connections therebetween, to allow operation of the conveyor without external fluid ports other than said ports of said switching valve.

2. The drive assembly of claim 1, comprising a pair of check valves having externally projecting operators positioned to be engaged and moved by said cylinder components as said cylinder components reciprocate relative to said piston components; said switching valve being pilot operated in response to opening and closing of said check valves.

3. A drive assembly for a reciprocating slat conveyor, comprising:

an elongated drive frame including a pair of fixed longitudinally spaced apart transverse frame members;

a plurality of piston-cylinder drive units; each said drive unit having a longitudinally fixed piston component, and a movable cylinder component; each piston component including an elongated piston rod having an inner end and an outer end, a piston head at its inner end, a ball member at its outer end, and first and second piston fluid passageways, said first piston fluid passageway extending through said ball member and said piston rod from said outer end to a first working chamber on one side of the piston head, and said second piston fluid passageway extending through said ball member and said piston rod from said outer end to a second working chamber on the opposite side of the piston head;

a ball member receiving socket structure for each drive unit, said socket structure including first and second socket fluid passageways communicating with said first and second piston fluid passageways, respectively, and said socket structure being fixed to one of said transverse frame members; and a manifold structure secured to said socket structures and including a plurality of internal valves positioned to control connection of said passageways to pressure and return; said valves including a switching valve having a single external pressure port and a single external return port, and four pilot-operated control valves positioned between said passageways and said switching valve to provide sequencing of movement of said cylinder components;

each said cylinder component having a closed end opposite said ball member;

said socket structures and said manifold structure having abutting surfaces forming internal fluid connections therebetween, to allow operation of the conveyor without external fluid ports other than said ports of said switching valve; and each said cylinder component being slidably supported by the other of said transverse frame members.

4. The drive assembly of claim 3, comprising a pair of check valves having externally projecting operators positioned to be engaged and moved by said cylinder components as said cylinder components reciprocate relative to said piston components; said switching valve being pilot operated in response to opening and closing of said check valves.

5. The drive assembly of claim 3, wherein each said socket structure has a detachable portion that, when detached, permits removal of the corresponding ball member from said socket structure.

6. A reciprocating slat conveyor, comprising:

an elongated conveyor frame including a pair of fixed longitudinally spaced apart transverse frame members;

a plurality of longitudinally extending elongated load engaging conveyor slats mounted on the conveyor frame and arranged in a plurality of slat sets;

a plurality of drive beams extending transversely of the a conveyor slats, centrally of the transverse frame members, each said drive beam being associated with a different set of the conveyor slats;

a plurality of piston-cylinder drive units, one for each set of conveyor slats and associated drive beam, each said drive unit having a longitudinally fixed piston component fixed to a first of said transverse frame members, a movable cylinder component, and a tubular extension that is connected to the cylinder component and extends endwise from it in a direction opposite the piston component; each said piston component including an elongated piston rod having an inner end and an outer end, a piston head at its inner end, a ball member at its outer end, and first and second piston fluid passageways, said first piston fluid passageway extending through said ball member and said piston rod from said outer end to a first working chamber on one side of the piston head, and said second piston fluid passageway extending through said ball member and said piston rod from said outer end to a second working chamber on the opposite side of the piston head; and each said cylinder component having a closed end opposite said ball end, said tubular extension being connected to said closed end;

a ball member receiving socket structure for each drive unit, said socket structure including first and second socket fluid passageways communicating with said first and second piston fluid passageways, respectively, and said socket structure being fixed to one of said transverse frame members;

a manifold structure secured to said socket structures and including a plurality of internal valves positioned to control connection of said passageways to pressure and return, said valves including a switching valve having a single external pressure port and a single external return port;

said socket structures and said manifold structure having abutting surfaces forming internal fluid connections therebetween, to allow operation of the conveyor without external fluid ports other than said ports of said switching valve;

a first connector connecting one of said drive beams to the cylinder component of its drive unit;

a second connector connecting a second of said drive beams to the tubular extension of its drive unit; and a fixed tubular slide bearing for each tubular extension, said slide bearings being connected to the second of said transverse frame members, and each said tubular extension extending through its tubular slide bearing;

wherein in use the cylinder components, their tubular extensions, the drive beams, and the conveyor slats reciprocate longitudinally relative to the transverse frame members, the fixed piston components, and the fixed tubular slide bearings.

7. The conveyor of claim 6, comprising a pair of check valves having externally projecting operators positioned to be engaged and moved by said cylinder components as said cylinder components reciprocate relative to said piston components; said switching valve being pilot operated in response to opening and closing of said check valves.

8. The conveyor of claim 6, wherein each said socket structure has a detachable portion that, when detached, permits removal of the corresponding ball member from said socket structure, and said connectors detachably connect the drive beams to the drive units.

9. The conveyor of claim 6, said conveyor comprising three said piston-cylinder drive units, and a third connector connecting a third of said drive beams to both the cylinder component and the tubular extension of its drive unit.

10. The conveyor claim 9, wherein each said socket structure has a detachable portion that, when detached, permits removal of the corresponding ball member from said socket structure, and said connectors detachably connect the drive beams to the drive units.

11. The conveyor of claim 10, comprising a pair of conduits connecting said ports of the switching valve to an on/off valve mountable remotely from said manifold structure on a structure in which said conveyor is installed, said on/off valve having a pair of quick connect/disconnect couplings connectable to a source of fluid pressure and return, respectively.

12. The conveyor of claim 8, comprising a pair of conduits connecting said ports of the switching valve to an on/off valve mountable on a structure in which said conveyor is installed remotely from said manifold structure, said on/off valve having a pair of quick connect/disconnect couplings connectable to a source of fluid pressure and return, respectively.

13. The conveyor of claim 7, comprising a pair of conduits connecting said ports of the switching valve to an on/off valve mountable on a structure in which said conveyor is installed remotely from said manifold structure, said on/off valve having a pair of quick connect/disconnect couplings connectable to a source of fluid pressure and return, respectively.

14. The conveyor of claim 6, comprising a pair of conduits connecting said ports of the switching valve to an on/off valve mountable on a structure in which said conveyor is installed remotely from said manifold structure, said on/off valve having a pair of quick connect/disconnect couplings connectable to a source of fluid pressure and return, respectively.

\* \* \* \* \*

UNITED STATES PATENT AND TRADEMARK OFFICE
CERTIFICATE OF CORRECTION

PATENT NO: 5,984,076

DATED: November 16, 1999

INVENTOR(S): Raymond Keith Foster

It is certified that error appears in the above-identified patent and that said Letters Patent are hereby corrected as shown below:

Column 2, line 1, "positioned to the" should be -- positioned to be --.

Claim 6, column 13, line 55, after "transversely of the", delete "a".

Claim 10, column 14, line 59, after "conveyor", insert "of".

Signed and Sealed this

Twenty-second Day of May, 2001

Attest:

NICHOLAS P. GODICI

Attesting Officer

Acting Director of the United States Patent and Trademark Office